(12) United States Patent
Bull

(10) Patent No.: US 11,662,488 B2
(45) Date of Patent: May 30, 2023

(54) SEISMIC DATA ACQUISITION UNITS AND RELATED METHODS

(71) Applicant: INOVA LTD., Grand Cayman (KY)

(72) Inventor: Andrew Bull, West Lothian (GB)

(73) Assignee: Inova Ltd., Grand Cayman (KY)

( * ) Notice: Subject to any disclaimer, the term of this patent is extended or adjusted under 35 U.S.C. 154(b) by 887 days.

(21) Appl. No.: 16/489,864

(22) PCT Filed: Mar. 8, 2018

(86) PCT No.: PCT/US2018/021544
§ 371 (c)(1),
(2) Date: Aug. 29, 2019

(87) PCT Pub. No.: WO2018/165424
PCT Pub. Date: Sep. 13, 2018

(65) Prior Publication Data
US 2020/0142085 A1 May 7, 2020

Related U.S. Application Data

(60) Provisional application No. 62/468,684, filed on Mar. 8, 2017.

(51) Int. Cl.
| | | |
|---|---|---|
| G01V 1/18 | (2006.01) | |
| G01V 1/16 | (2006.01) | |
| G01S 19/01 | (2010.01) | |
| G01V 1/22 | (2006.01) | |

(52) U.S. Cl.
CPC .............. *G01V 1/166* (2013.01); *G01S 19/01* (2013.01); *G01V 1/223* (2013.01); *G01V 1/181* (2013.01)

(58) Field of Classification Search
CPC ........ G01V 1/166; G01V 1/223; G01V 1/181; G01S 19/01
See application file for complete search history.

(56) References Cited

U.S. PATENT DOCUMENTS

| | | | | |
|---|---|---|---|---|
| 3,555,502 A | * | 1/1971 | Davis, Jr. et al. ..... | G01V 1/104 455/96 |
| 3,859,598 A | * | 1/1975 | McElwain ................ | E21B 7/26 455/96 |
| 8,004,933 B2 | | 8/2011 | Iseli et al. | |
| 8,644,111 B2 | * | 2/2014 | Ray ......................... | G01V 1/00 702/14 |
| 8,836,503 B2 | | 9/2014 | Gelvin et al. | |
| 10,120,088 B2 | | 11/2018 | Jurok et al. | |

(Continued)

FOREIGN PATENT DOCUMENTS

| | | |
|---|---|---|
| CA | 2887400 C | 4/2006 |
| EP | 2180344 A2 | 4/2010 |

(Continued)

OTHER PUBLICATIONS

Kellems Wire Management Products, www.hubbell-wiring.com (Year: 1996).*

(Continued)

*Primary Examiner* — Krystine E Breier
(74) *Attorney, Agent, or Firm* — Crowe & Dunlevy, P.C.

(57) ABSTRACT

An apparatus for performing a seismic survey includes a data unit disposed in a housing, a flexible tether connected to the housing at a first end and having a second end, the tether including at least signal carrying wire and a tension conveying member, and an antenna connected to the second end of the tether, the data unit in signal communication with the antenna via the at least one signal carrying wire.

13 Claims, 3 Drawing Sheets

(56) References Cited

U.S. PATENT DOCUMENTS

| | | | |
|---|---|---|---|
| 2008/0144442 A1* | 6/2008 | Combee | G01V 1/22 |
| | | | 367/131 |
| 2011/0051550 A1 | 3/2011 | Lindberg | |
| 2012/0082002 A1 | 4/2012 | Iseli | |
| 2013/0176821 A1* | 7/2013 | Jiang | G01V 1/164 |
| | | | 367/43 |
| 2014/0207523 A1 | 7/2014 | Leach et al. | |
| 2014/0219051 A1 | 8/2014 | Pavel | |
| 2014/0219055 A1* | 8/2014 | Goujon | G01V 1/181 |
| | | | 367/56 |
| 2015/0053480 A1 | 2/2015 | Kare et al. | |
| 2019/0271790 A1 | 9/2019 | Westerdahl et al. | |

FOREIGN PATENT DOCUMENTS

| | | | | |
|---|---|---|---|---|
| GB | 2332946 A * | 7/1999 | | B63B 21/66 |
| GB | 2353546 A | 2/2001 | | |
| WO | 2012118477 A1 | 9/2012 | | |
| WO | WO-2012118477 A1 * | 9/2012 | | G01V 1/162 |
| WO | WO-2014076075 A2 * | 5/2014 | | B63G 8/001 |
| WO | WO-2014090811 A2 * | 6/2014 | | G01V 1/16 |
| WO | 2018165424 A1 | 9/2018 | | |
| WO | 2019082292 A1 | 5/2019 | | |
| WO | WO-2020225584 A1 * | 11/2020 | | B64C 39/024 |

OTHER PUBLICATIONS

Kevlar Aramid Fiber Technical Guide (Year: 1971).*
EP18763516 Supplementary Search Report dated Nov. 4, 2020.

\* cited by examiner

SEISMIC DATA ACQUISITION UNITS AND RELATED METHODS

BACKGROUND OF THE DISCLOSURE

1. Field of the Disclosure

The technical field generally relates to seismic exploration, and more particularly to seismic data acquisition units for use in seismic exploration.

2. Background of the Art

Oil companies conduct seismic surveying to lower risk and to reduce costs of locating and developing new oil and gas reserves. Seismic surveying is, therefore, an up front cost with intangible return value. Consequently minimizing the cost of seismic surveying and getting quality results in minimum time are important aspects of the seismic surveying process.

Seismic surveys are conducted by deploying a large array of seismic sensors over a terrain of interest. These arrays may cover over 50 square miles and may include 2000 to 5000 seismic sensors. An energy source such as buried dynamite may be discharged within the array to impart a shockwave into the earth. The resulting shock wave is an acoustic wave that propagates through the subsurface structures of the earth. A portion of the wave is reflected at underground discontinuities, such as oil and gas reservoirs. These reflections are then sensed at the surface by the sensor array and recorded as seismic data. Such sensing and recording are referred to herein as seismic data acquisition. This seismic data is then processed to generate a three dimensional map, or seismic image, of the subsurface structures. The map may be used to make decisions about drilling locations, reservoir size and pay zone depth.

The present disclosure addresses the continuing need for robust and easily deployable seismic data acquisition units that may be used to perform seismic surveys.

SUMMARY OF THE DISCLOSURE

In aspects, the present disclosure provides an apparatus for performing a seismic survey. The apparatus may include a housing, a data unit disposed in a housing, a flexible tether, and an antenna. The flexible tether may be connected to the housing at a first end and have a second end. The tether may include at least one signal carrying wire and a tension conveying member, and an antenna connected to the second end of the tether. The data unit is in signal communication with the antenna via the at least one signal carrying wire.

Examples of certain features of the systems, methods and apparatus disclosed herein have been summarized rather broadly in order that detailed description thereof that follows may be better understood, and in order that the contributions to the art may be appreciated. There are, of course, additional features of the disclosure that will be described hereinafter and will form the subject of the disclosure. The summary provided herein is not intended to limit the scope.

BRIEF DESCRIPTION OF THE DRAWINGS

The novel features of this disclosure, as well as the disclosure itself, will be best understood from the attached drawings, taken along with the following description, in which similar reference characters generally refer to similar elements, and in which.

DETAILED DESCRIPTION

The present disclosure relates to seismic data acquisition units for seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein.

Figure 1:
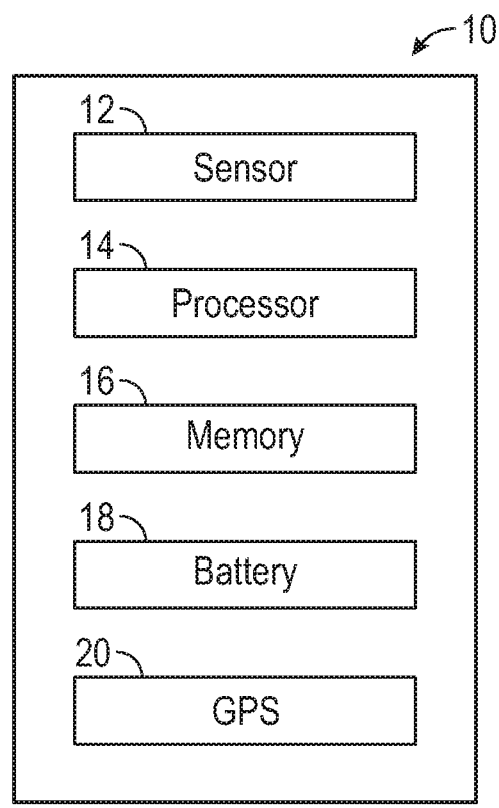
FIG. 1 schematically illustrates one embodiment of a data package that may be used with seismic data acquisition units of the present disclosure.

FIG. 1 schematically illustrates one exemplary and non-limiting data acquisition (DA) package 10 that may be used with seismic data acquisition units in accordance with the present disclosure. Generally speaking, the DA package 10 includes the hardware and software required to detect seismic signals, generate data representing the detected signals, and store and/or transmit the data. The data may be stored/transmitted with or without processing. In one embodiment, the DA package 10 may include a sensor 12, a processor 14, a memory module 16, a battery 18, and a GPS module 20. It should be understood that other DA packages may include different or additional components (e.g., a transceiver unit, BLUETOOTH module, WiFi module, etc.).

The sensor 12 may be a multi-component sensor such as a three-component accelerometer sensor incorporating micro electro-mechanical systems (MEMS) technology and application-specific integrated circuits (ASIC), a velocity sensors such as a conventional geophone, or any other sensor capable of sensing seismic energy. The processor 14 may include micro-processors and other circuitry for executing programmed instructions and algorithms. The memory module 16 can be a nonvolatile memory of sufficient capacity for storing information for later collection or transmission. The memory module 16 may be in the form of a memory card, removable miniature hard disk drive, an Electrically-Erasable Programmable Read Only Memory (EEPROM) or the like. The battery 18 may rechargeable and have any suitable chemistry (e.g., nickel-metal hydride (NMH), a lithium-ion or lithium-polymer, etc.). The GPS module 20 may include a suitable on-board circuitry to determine geographical coordinates based on a received GPS signal. The GPS module 20 may receive the GPS signal from an antenna. As discussed below, the position of the antenna may be varied to suit a particular application.

Figure 2:
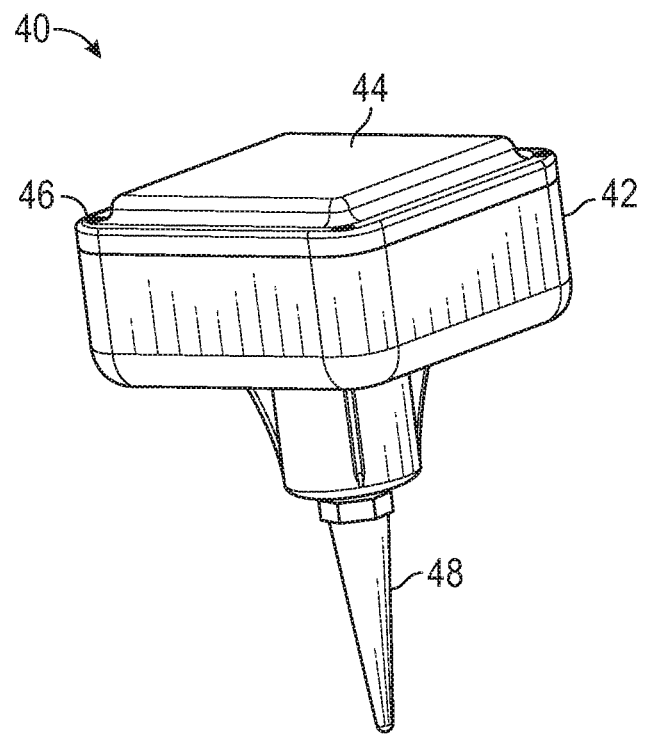
FIG. 2 illustrates one embodiment of a seismic data acquisition unit according to the present disclosure.

Referring to FIG. 2, there is shown a seismic data acquisition unit 40 that is fully integrated within one housing 42. In one arrangement, the DA package 10 (FIG. 1) is sealed within the housing 42. Also, the GPS module 20 (FIG. 1) is in signal communication with an antenna 44 that is fixed to an outer surface 46 of the housing 42. A spike 48 may extend from the housing 42 and be shaped to penetrate into the ground. The seismic data acquisition unit 40 may be considered self-contained in that all components required to detect seismic signals, store information, and communicate with external devices are contained in or on the housing 42.

Figure 3:
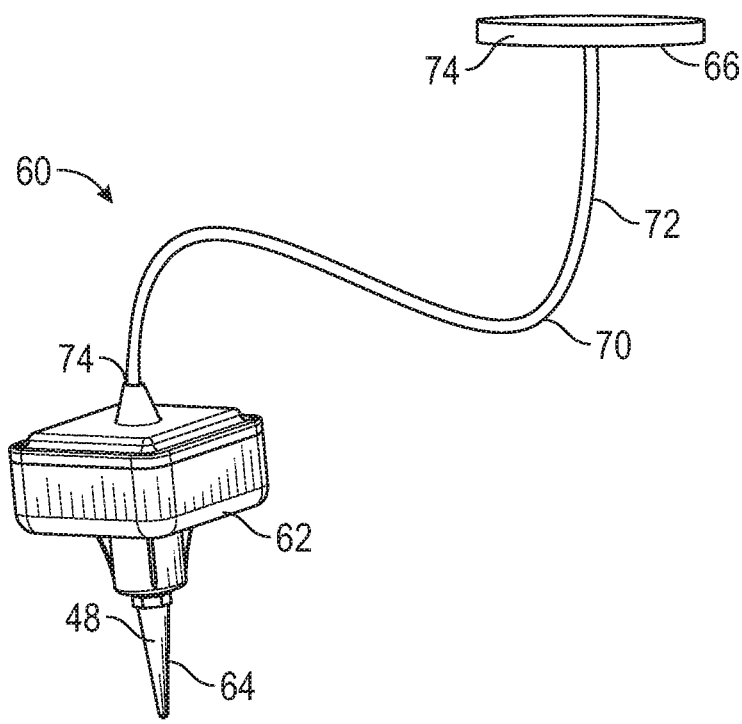
FIG. 3 illustrates one embodiment of a seismic data acquisition unit according to the present disclosure that uses a flexible tether.

Referring to FIG. 3, there is shown another seismic data acquisition unit 60 in accordance with the present disclosure. The unit 60 includes a housing 62 and a spike 64. In this arrangement, an antenna 66 is also in signal communication with the GPS module 20 (FIG. 1). However, a tether 70 connects the antenna 66 to the housing 62 so that the antenna 66 does not directly contact the housing 62. The seismic data acquisition unit 60 may be also be considered self-contained in that all components required to detect seismic signals, store information, and communicate with external devices are contained in the housing 62, except for the antennae 66 and tether 70.

In one embodiment, the tether 70 is configured as a flexible handling element. That is, the tether 70 has sufficient material strength to withstand the loadings associated with carrying, un-planting, or otherwise manipulating the unit 60 during seismic field operations. By "flexible," it is meant that the tether 70 may be coiled without undergoing plastic deformation. Suitable constructions and materials for the tether 70 may include plastics, metals, and composite that are configured to coil around a five inch diameter without exhibiting plastic deformation. Larger or smaller diameters may be suitable for specific applications.

In one arrangement, the tether 70 may include a sheath 72 and rugged connections 74. The sheath 72 may be formed of metals, composites, plastics, Kevlar, or other suitable materials. The sheath 72 may be configured to have a tensile strength at least sufficient to withstand the tension associated with a specified handling event, e.g., pulling a planted data acquisition unit 60 out of the ground, carrying the data acquisition unit 60 such that the antenna 66 and housing 62 hang freely, etc.

Figure 3A:
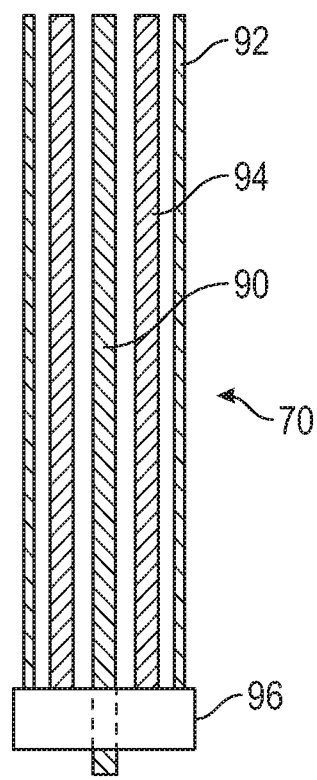
FIG. 3A illustrates a cross-section of one embodiment of a tether according to the present disclosure that uses a flexible tether.

FIG. 3A illustrates a sectional view of the tether 70. Referring to FIGS. 3 and 3A, in embodiments, the tether 70 may be formed to include one or more signal carrying wires 90 for transmitting signals, one or more electrically insulating layers 92 to electrically insulate the signal carrying wire 90, and one or more tension carrying members 94. The one or more tension carrying members 94 bear the tension loads and prevent these loadings from affecting the signal carrying wires. For example, the tension carrying members 94 may physically connect to a connector block 96 that is fixed to the housing 62 of the DA unit 60 and/or the enclosure or base (not shown) of the antenna 66. The tension carrying members 94 may include one or more tubes, wires, cables, etc. and may be formed of materials such as metals, plastics, and/or composites. The signal carrying wire 90 is not fixed to the connector block 96, which allows tension to be passed from the tension carrying members 94 to the connector block 96 without affecting the signal carrying wire 90. It should be noted that the electrically insulating layers 92 may function as the sheath 72. In that case, the electrically insulating layers 92 may carry and transfer tension without the need for the tension carrying wires 90.

Figure 4:
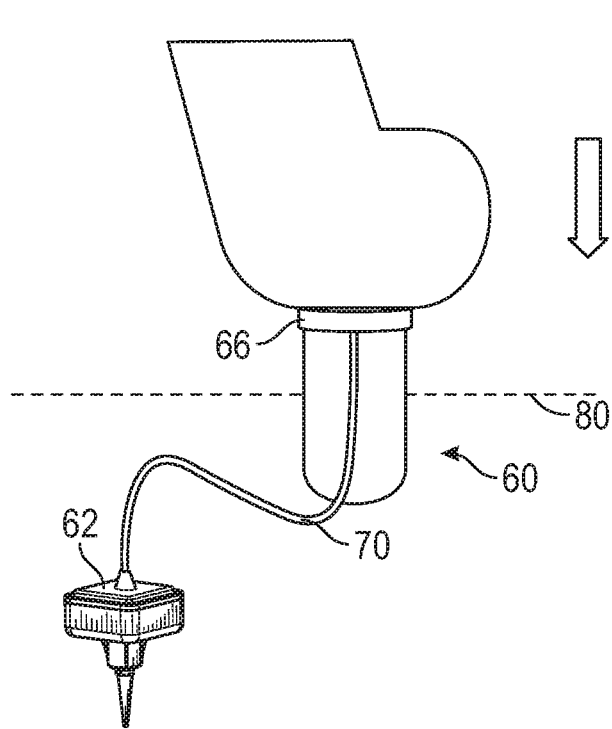
FIGS. 4-6 illustrate exemplary uses of the FIG. 3 embodiment.

Referring to FIG. 4, there is shown the unit 60 planted in the ground. In one deployment, the housing 62 is buried beneath a surface 80 and the antenna 66 is fixed at the surface 80. The housing 62 may be buried anywhere from one to two inches below the surface 80 to about twelve inches to twenty four inches below the surface 80. Other depths may be used under specific circumstances. The tether 70 allows the housing 62 to be positioned underground while having the antenna 66 at the surface 80. This deployment minimizes the amount of exposed equipment and protects the housing 62 from inadvertent contact with personnel, machinery, or animals. The housing 62 may include seals (not shown) and other barriers that prevent moisture and contaminants from entering the housing 62. While planted, the unit 60 may acquire and store seismic data. Advantageously, the antenna 66 is at the surface 80 and can detect GPS signals during such data acquisition.

Figure 5:
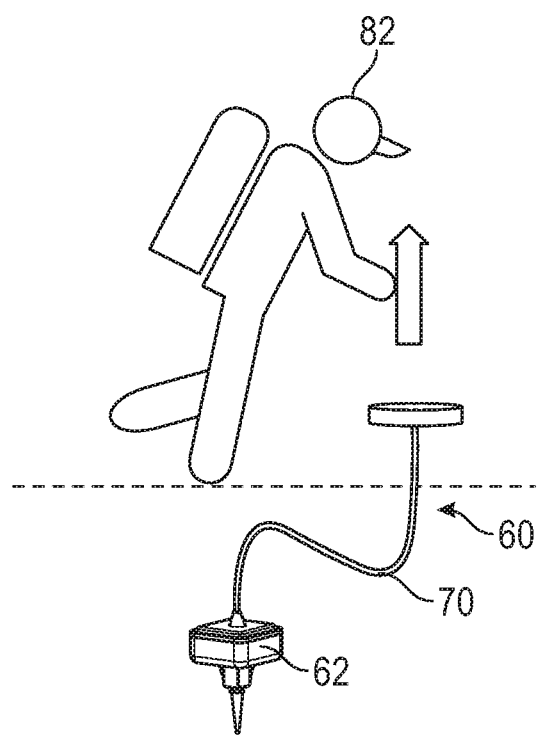

Referring to FIG. 5, there is shown a worker 82 retrieving the unit 60 from the ground. Conveniently, the worker 82 can use the tether 70 as a handle to pull out the buried housing 62. Thus, it should be appreciated that the tether 70 has multiple functions. One is to allow optimal placement of the housing 62 and antenna 66. Another function is to facilitate retrieval of the unit 60.

Figure 6:
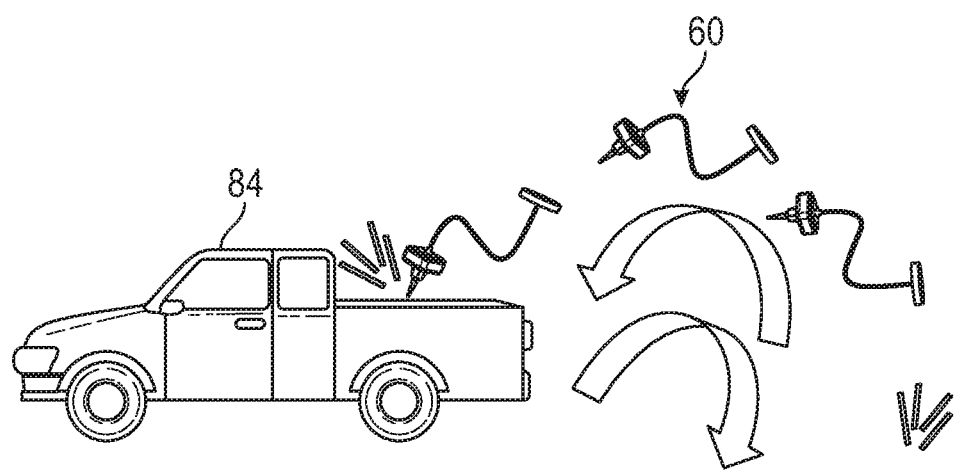

Referring to FIG. 6, there is shown a vehicle 84 that may be used to deploy and retrieve the units 60. During deployment, the tether 70 may be used as a handle to toss the units 70 onto the ground. During retrieval, the tether 70 may be used to throw the units 70 into the vehicle 84.

It should be appreciated that the tether 70 has two distinct functions: one is to form a signal conveying connection between the housing 62 and the antenna 66 and the other is to act as a handle that can be physically manipulated during conventional seismic operations without damaging the housing 62 or the antenna 66. In embodiments, the tether 70 may be configured to support tension loadings in the amount of at least 10 Newtons, at least 20 Newtons, at least 30 Newtons, or at least 40 Newtons.

The disclosure herein is provided in reference to particular embodiments and processes to illustrate the concepts and methods. Such particular embodiments and processes are not intended to limit the scope of the disclosure or the claims. All such modifications within the scope of the claims and disclaimers are intended to be part of this disclosure. For example, while some elements may have been referred to in the singular or the plurality, no numerical restrictions are intended.

What is claimed is:

1. An apparatus for performing a seismic survey, comprising:
    a self-contained housing;
    a data package disposed in the housing, the data package including a sensor configured to acquire seismic data, a processor, a memory module, a battery, and a GPS module, wherein only the data package is configured to store the seismic data;
    a flexible tether connected to the housing at a first end and having a second end, the tether including at least one signal carrying wire and a tension conveying member; and
    an antenna connected to the second end of the tether, the data package in signal communication with the antenna via the at least one signal carrying wire, wherein the antenna does not directly contact the housing.

2. The apparatus of claim 1, wherein a first connector block associated with the housing and a second connector block associated with the antenna, wherein the tension carrying member is connected to first and the second connector block and the at least one signal carrying wire is not connected to first and the second connector block.

3. The apparatus of claim 1, wherein the tension conveying member is one of: (i) a tube, (ii) a wire, and (iii) a cable.

4. The apparatus of claim 1, wherein the tension conveying member can support a tension loading of at least 10 Newtons.

5. A method for performing a seismic survey, comprising:
configuring a seismic data acquisition unit to include:
- a housing,
- a data package disposed in the housing, the data package including a sensor configured to acquire seismic data, a processor, a memory module, a battery, and a GPS module, wherein only the data package is configured to store the seismic data;
- a flexible tether connected to the housing at a first end and having a second end, the tether including at least one signal carrying wire and a tension conveying member, and
- an antenna connected to the second end of the tether the data package in signal communication with the antenna via the at least one signal carrying wire, wherein the antenna does not directly contact the housing;

deploying the seismic data acquisition unit; and
acquiring and storing seismic data in housing.

6. The method of claim 5, further comprising:
burying the housing in the ground and exposing the antenna at a surface location.

7. The method of claim 6, further comprising:
pulling the buried housing out of the ground using the tether.

8. The method of claim 5, further comprising:
tossing the housing by manually grasping the tether.

9. The method of claim 5, further comprising a first connector block associated with the housing and a second connector block associated with the antenna, wherein the tension carrying member is connected to first and the second connector block and the at least one signal carrying wire is not connected to first and the second connector block.

10. The method of claim 5, wherein the tension conveying member is one of: (i) a tube, (ii) a wire, and (iii) a cable.

11. The method of claim 5, wherein the tension conveying member can support a tension loading of at least 10 Newtons.

12. The method of claim 5, wherein the housing is positioned underground while the antenna at a surface.

13. The apparatus of claim 1 wherein the housing is self-contained, the self-contained housing enclosing all components required to detect seismic signals and store information, and the housing using only the antennae and tether to communicate with an external device.

* * * * *